United States Patent [19]

Largeau

[11] Patent Number: 5,442,963
[45] Date of Patent: Aug. 22, 1995

[54] TEMPERATURE-COMPENSATED VIBRATING BEAM MICROSENSOR

[75] Inventor: Didier Largeau, Oslo, Norway

[73] Assignee: Solartron Group Limited, England

[21] Appl. No.: 196,130

[22] PCT Filed: Aug. 19, 1992

[86] PCT No.: PCT/FR92/00806
§ 371 Date: Feb. 22, 1994
§ 102(e) Date: Feb. 22, 1994

[87] PCT Pub. No.: WO93/04347
PCT Pub. Date: Mar. 4, 1993

[30] Foreign Application Priority Data

Aug. 23, 1991 [FR] France .................... 91 10623

[51] Int. Cl.$^6$ .................................... G01L 1/10
[52] U.S. Cl. ............................. 73/766; 73/705
[58] Field of Search ........... 73/800, 766, 778, 862.41, 73/862.59, 862.623, 862.624, 702, 704, 705, 708; 356/35.5; 250/231.11, 231.19, 227.14

[56] References Cited

U.S. PATENT DOCUMENTS 5,105,665 4/1992 Parsons et al. .................... 73/705

FOREIGN PATENT DOCUMENTS 0266974 5/1988 European Pat. Off. .
0428263 5/1991 European Pat. Off. .
2198531 6/1988 United Kingdom .

Primary Examiner—Robert Raevis
Attorney, Agent, or Firm—Lerner, David, Littenberg, Krumholz & Mentlik

[57] ABSTRACT

A microsensor for application in measurements of pressure including a temperature compensated vibratory bar comprises means for measuring the resonance frequency of the vibratory bar, means for measuring the temperature by interferometric determination of the optical thickness of the bar and means for determining a physical quantity to be measured based on resonance frequency and temperature.

9 Claims, 3 Drawing Sheets

TEMPERATURE-COMPENSATED VIBRATING BEAM MICROSENSOR

The present invention relates to a temperature-compensated vibrating beam microsensor. It is particularly applicable to pressure measurements over a wide range of temperatures capable of going from several tens of degrees Celsius below 0° C. to several hundreds of degrees Celsium above 0° C.

Vibrating beam microsensors are known; descriptions of them can be found in the documents GB 2 185 106 and GB 2 194 049.

This type of sensor, applied to pressure measurement, is implemented in semiconductor material, for example silicon, and has a vibrating beam joined at its ends to a diaphragm subjected to pressure variations. The deformation of the diaphragm results in variations in the resonant frequency of the vibrating beam. These variations of the resonant frequency of the beam are therefore measured to deduce the pressure.

The static resonant frequency of the beam when not subjected to a force is determined during its implementation. The measurement of the variations of this frequency while the beam is subjected to a force can be effected by interferometry.

The interferometer, according for example to the document GB 2 185 106, is constituted by the end of the optical fibre directing a continuous monochromatic light beam for excitation of the beam, and the upper surface of the beam.

The transmission coefficient of the interferometer depends on the distance separating the end of the fibre and the facing surface.

When the transmission is maximum, the light beam is absorbed by the beam resulting in heating by photothermic effect of the upper part of the beam, which deforms by expansion. The fibre-beam distance varies, resulting in a reduction of the transmission coefficient and consequently a reduction of the heating, which tends to restore the beam to its initial state.

The beam thus begins vibrating at its resonant frequency, maintained by variations of the transmission coefficient. The phenomenon of autoexcitation is present.

The modulation of the light beam reflected by the beam is detected in order to measure the resonance frequency, which permits the deformation of the beam due to a pressure on the diaphragm to be deduced.

This detection presents some difficulties. In practice, to have maximum sensitivity, the distance between the end of the optical fibre and the upper surface of the beam must be precisely set at a value equal to $\lambda/8(2k+1)$ where k is an integer and $\lambda$ is the wavelength of the light source. But the control of this distance with the required precision is very difficult to implement; on the other hand, the rest distance between the end of the fibre and the upper surface of the beam depends on external factors. For example, large variations in temperature result in the variation of this distance.

Another disadvantage of this type of sensor lies in its temperature dependence. In practice, the Young's modulus of silicon varies substantially as a function of temperature variations, which affects the resonant frequency of the vibrating beam and as a result distorts the measurements.

To alleviate this disadvantage, simultaneous temperature measurements are made, and the variation in Young's modulus is compensated in accordance with a previously determined calibration.

U.S. Pat. No. 4,972,076 describes a microsensor with two vibrating beams. The first, joined with the diaphragm at both of its ends, permits the measurement of pressure. The second, joined with the diaphragm at one of its ends only, the other end being free, is sensitive only to variations in temperature, so the measurement of its Young's modulus permits the necessary corrections to be applied to the pressure measurement.

The two beams are excited by the same modulated light beam, which results in the heating of the beams in accordance with their resonant frequencies. But it turns out that the simultaneous excitation of both beams is delicate to implement effectively.

The present invention has as an object to permit a temperature-compensated pressure measurement by means of a microsensor which is simpler to implement than the microsensors of the prior art.

The present invention also has as an object to provide a system for detecting the resonant frequency of the beam comprising an interferometer which is not very sensitive to temperature variations, not requiring, in contrast with the systems of the prior art, surface treatments which are difficult to implement and which reduce the performance of the sensor.

The present invention therefore concerns a temperature-compensated vibrating beam microsensor comprising:
- a vibrating beam having a resonant frequency dependent upon a physical parameter to be measured,
- means for exciting the vibrating beam,
- means for measuring the resonant frequency of the vibrating beam,
- means for measuring the optical thickness of the beam,
- means for deducing the temperature from this measurement, and
- means for determining the physical parameter to be measured from the resonant frequency and the temperature.

According to a preferred implementation, the means for measuring the optical thickness of the beam comprise:
- means for illuminating the beam with a light beam having a wide wavelength spectrum, with a central wavelength chosen in the zone of quasi-transparence of the material forming the beam,
- a spectroscope for measuring the wavelength spectrum of the light beam reflected by the beam, and
- means for deducing the optical thickness from a characterisation of a modulation of the wavelength spectrum, the beam being an interferometer for the light beam.

Advantageously, the spectroscope comprises a diffraction grating and an array of optical sensors.

Advantageously, the illumination means comprise a light emitting diode coupled to an optical fibre directing the light beam from the diode onto the beam.

Preferentially, the exciting means comprise a laser diode modulated at the resonant frequency of the beam and supplying light pulses, an optical fibre directing these light pulses onto the beam.

According to a particular implementation, the microsensor comprises:

a diaphragm, the vibrating beam being joined by its ends to the diaphragm, the frequency of vibration of the beam being a function of a deformation of the diaphragm under the effect of a pressure, means for measuring the resonant frequency comprising means for illuminating the beam with a light beam, an interferometer constituted by the facing surfaces of the beam and the diaphragm, at least one optical sensor adapted to detect a light beam reflected by the interferometer and to deliver a signal proportional to the resonant frequency of the beam.

Preferably, the illumination means are common to the resonant frequency measuring means and to the means for measuring the optical thickness of the beam.

Advantageously, the illumination means have a wide spectrum, dispersion means being adapted to disperse the different wavelength components of a light beam reflected by the interferometer, optical sensors being adapted to detect the dispersed components, these sensors delivering a signal proportional to the resonant frequency of the beam, selection means selecting the highest intensity signal proportional to the resonant frequency.

According to a preferred implementation, the dispersion means are common to the means for measuring the resonant frequency and to the means for measuring the optical thickness of the beam.

The characteristics and advantages of the invention will be better apparent from the reading of the description which follows, given purely by way of illustrative and non-limitative example with reference to the annexed drawings, in which.

Figure 3:
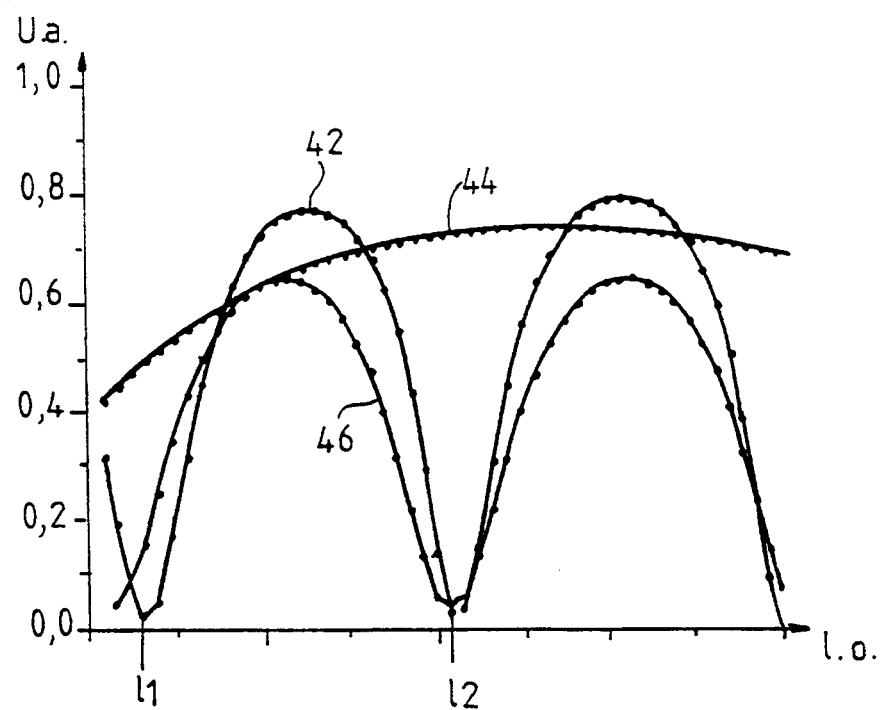
Figure 5:
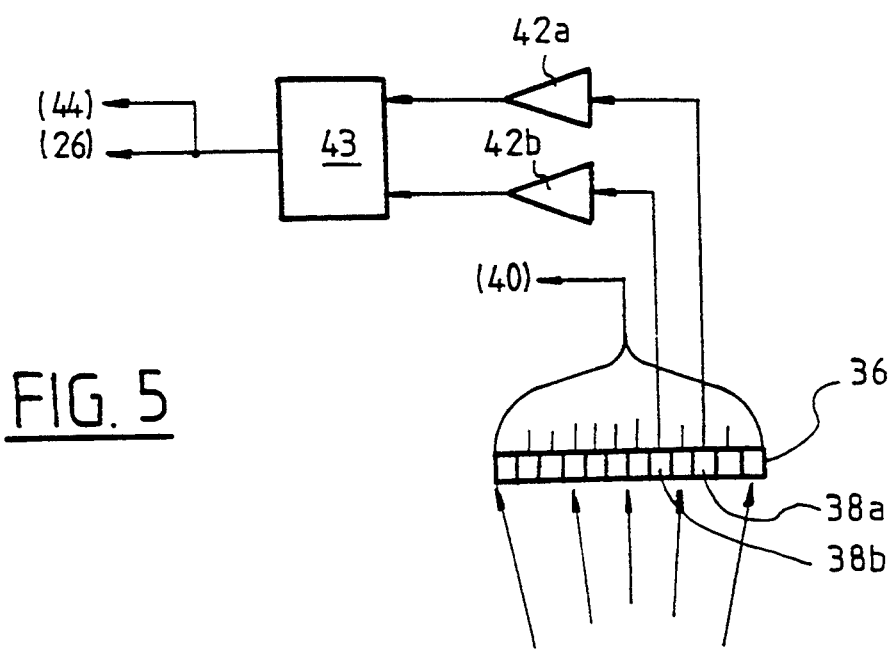
Figure 4:
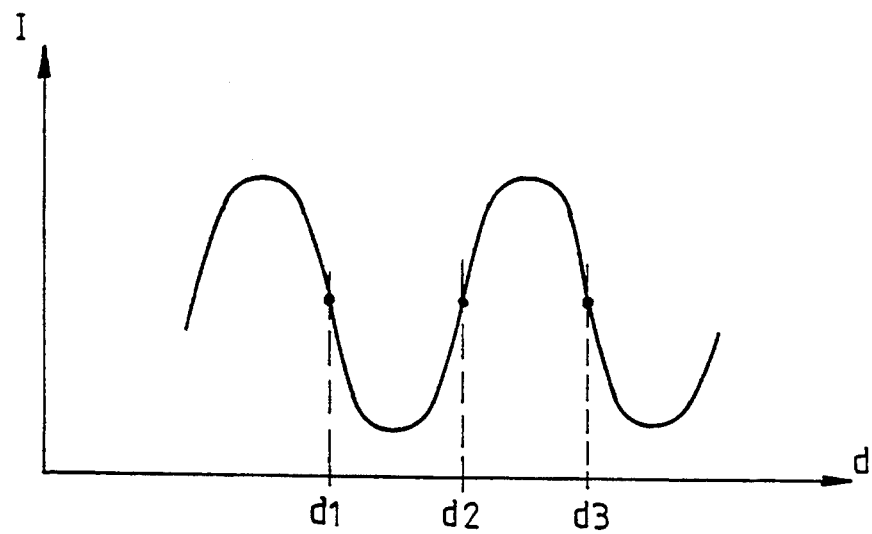
Figure 6:
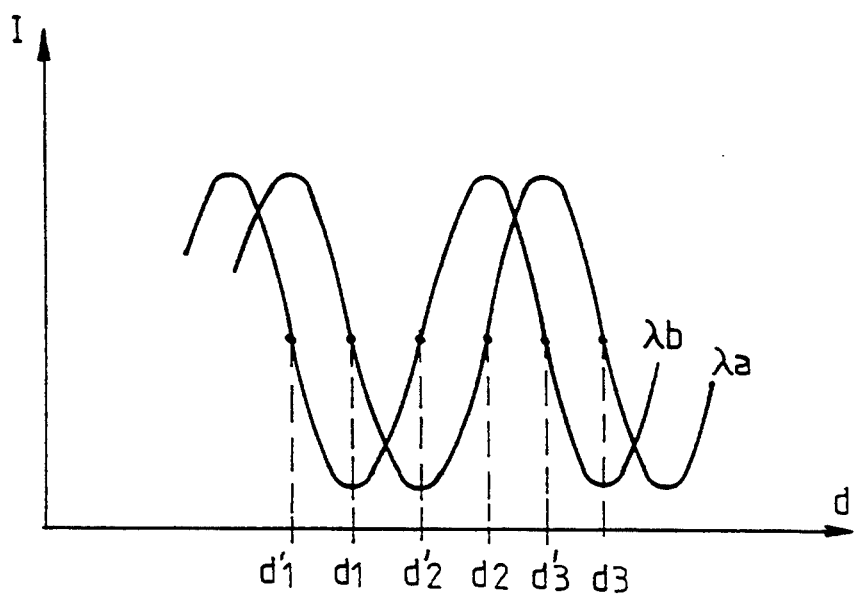

FIG. 3 represents schematically different wavelength spectra resulting from a simulation of the operation of the microsensor, FIG. 4 shows schematically the trend of the variations of intensity I of a spectral component with the distance d separating the beam from the diaphragm, FIG. 5 shows schematically a modification of the apparatus for a measurement made at several wavelengths, FIG. 6 shows schematically the tend of the variations of intensity I of two spectral components with the distance d separating the beam from the diaphragm.

A microsensor in accordance with the invention will now be described with reference to FIG. 1. The particular implementation is provided for application to the measurement of pressure. But it is known that the resonance frequency can permit the determination of other types of forces, depending on the way chosen to make the resonant frequency of the vibrating beam vary.

The material chosen to implement the microsensor must be sufficiently stable. For preference, a crystal is chosen from among quartz, sapphire, semiconductor or other materials.

In the example described, a diaphragm 10 responsive to pressure is chemically etched in a rectangular silicon substrate 12. The rectangular form of the diaphragm shown in FIG. 1 is not limitative, and a circular form can also be chosen. A beam, implemented by micromachining in a silicon wafer 14, is positioned in the centre of the diaphragm. This beam is shown from above in FIG. 2.

The wafer 14 is fusion bonded to the substrate 12 at very high temperature, such that the extremities of the beam 16 are joined to the diaphragm. This beam 16 is adapted to vibrate resonantly.

The resonant frequency of the beam is a function of its dimensions, and of temperature by reason of the dependence of Young's modulus on temperature. Additionally, the beam being joined at its extremities to the diaphragm, its resonant frequency is a function of the tension applied to it by reason of the flexure of the diaphragm and therefore of the pressure to which the diaphragm is subjected. The beam is subjected to optical excitation which acts by alternate heating (photothermic effect) at the resonant frequency.

To this end, a cap 18 is secured to the wafer 14. This cap 18 is pierced by an orifice permitting the passage and holding of an optical fibre 20, whose end faces the beam 16.

The cap 18 consists of a rectangular silicon substrate of the same dimensions of the substrate 12 in which the diaphragm 10 is formed. To form the cap, the substrate is hollowed by chemical etching. The depth of the etching is chosen to distance the end of the optical fibre 20 sufficiently from the beam 16, as will be seen in more detail hereinafter. The thickness of the material remaining after the etching must be sufficient to carry out the function of holding the fibre.

The cap is penetrated, with the help of a suitable technique, for example chemically or by ultrasound or even by laser, by a channel in which the optical fibre 20 is sealed.

The cap is sealed around its periphery to the wafer 14.

Figure 1:
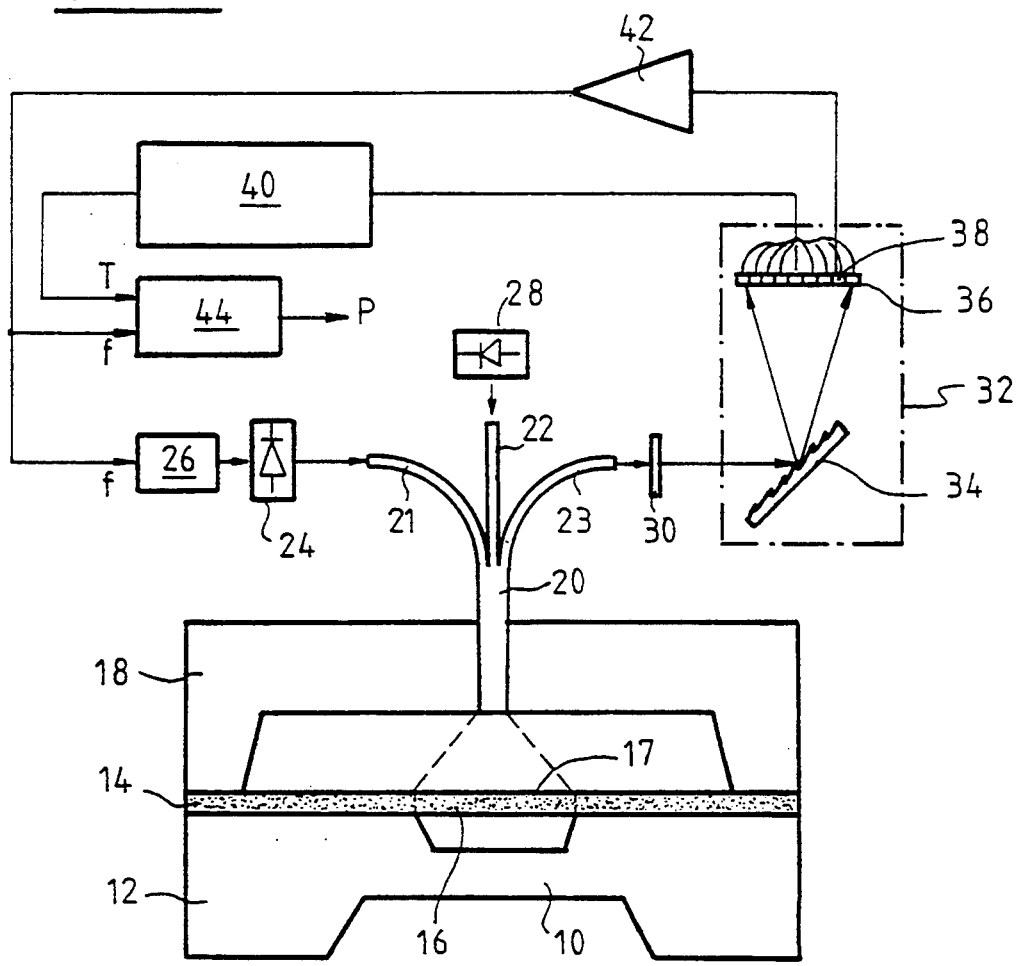
FIG. 1 represents schematically apparatus according to the invention.
Figure 2:
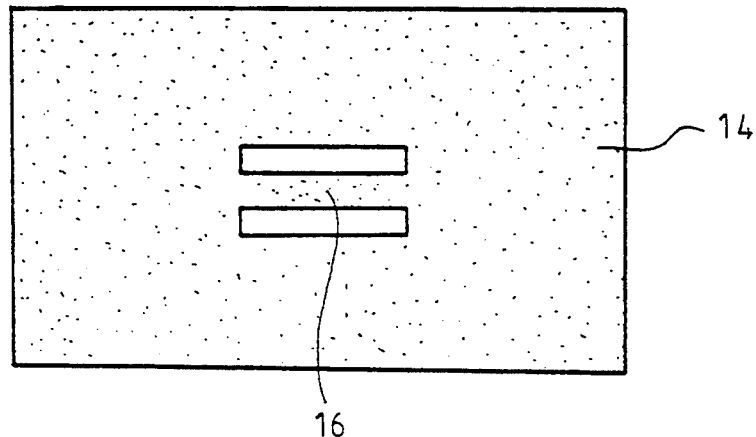
FIG. 2 represents schematically a wafer in which a vibrating beams is formed.

In the example of implementation shown in FIG. 1, the optical fibre 20 has a three-pronged end, thus presenting three branches 21, 22, 23.

The branch 21 is used for the introduction of an excitation light beam into the fibre 20. This excitation light beam is constituted by pulses emitted by a laser diode 24 at a frequency equal to the resonant frequency of the beam 16. The wavelength of the excitation beam is chosen to be in the absorption band of the material forming the beam, for example 630 nm or 670 nm for silicon.

A modulator 26, connected to the laser diode 24, controls the supply of light pulses.

The light pulses are directed onto the beam 16 by the optical fibre 20. The absorption of the excitation light takes place principally at the level of the upper surface 17 of the beam 16. In this way, a temperature gradient appears in the beam between the upper surface 17 and the lower surface, producing a stress gradient in the beam. The pulsed nature of the light results in a temporal modulation of the temperature gradient, which has the effect of setting the beam in vibration.

The resonant frequency changing with the pressure exerted on the diaphragm 10, the microsensor comprises means for measuring the resonant frequency, having its output connected to an input of the modulator 26 so as to form a feedback loop and to permit the maintenance of the vibration of the beam 16.

The pressure applied to the diaphragm is determined from the knowledge of the resonant frequency, but this latter also depends on the temperature. The microsensor comprises means for measuring the temperature, permitting a compensation to be made in the pressure determination.

The means for measuring temperature comprise means for measuring the optical thickness of the beam 16. A light emitting diode 28 having a wide wavelength spectrum, extending for example from 800 nm to 900 nm, delivers a light beam whose centre wavelength is chosen to be in the zone of quasi-transparence of the material forming the beam 16.

In other words, the wavelength is chosen such that more than a certain percentage of the light beam is transmitted through the beam. For example, a wavelength of 850 nm is chosen, which is on the edge of the absorption band of silicon, but more than 50% of the beam is transmitted since the thickness of the beam 16 is only a few micrometres.

The wide spectrum light beam is applied to the input of the branch 22 of the optical fibre 20, and illuminates the beam 16 from the output of this fibre 20.

The beam 16 constitutes an interferometer for the wide spectrum light beam. The light beam reflected by the beam 16 thus has its spectrum modulated as a function of the optical thickness of the beam 16. The optical thickness is equal to the product of the geometric thickness and the refractive index of the material forming the beam 16. Although the geometric thickness varies little (of the order of $10^{-6}$ in relative value) as a function of the temperature—in the range of temperature studied, not exceeding 600° C.—the refractive index varies greatly (of the order of $10^{-4}$ in relative value, according to the analysis wavelength chosen) as a function of temperature. The measurement of the modulation of the spectrum thus permits measurement of the temperature, the variations of the refractive index as a function of temperature being determined from a previous calibration.

The wide spectrum light beam reflected by the beam 16 enters the optical fibre 20 and exits in particular from the end of the branch 23 of this fibre.

A filter 30 permits the complete elimination of the reflected beam derived from the excitation without altering the transmission of the wide spectrum reflected beam. This latter enters a spectroscope 32 comprising a diffraction grating 34 which bends the wavelength components of the beam according to different angles to form a spread beam. An array of optical sensors 36 detects the spread beam. Each sensor corresponding to a particular wavelength delivers as an output a signal corresponding to the light intensity detected.

Processing means 40 connected at its inputs to the outputs of the detectors 36 effects an analysis of the wavelength spectrum. It calculates the optical thickness from the modulation parameters and deduces the temperature from it, the temperature dependence of the optical thickness having been previously characterised and stored.

This processing means 40 can be constituted by a microprocessor (connected to its usual peripherals) programmed to obtain the result sought.

In FIG. 3, different spectra resulting from a simulation of the operation of the apparatus are represented schematically. The abcissae (1.0) correspond to wavelength; the ordinates correspond to the intensities measured by the array of sensors represented in arbitrary units (u.a.).

The curve 46 represents the shape of the spectrum measured by the processing system. This curve results from the combination of many components resulting from the action of different interferometers operating in the apparatus.

In fact three distinct interferometers which interact with the wide spectrum light beam can be counted.

In FIG. 1, the first can be seen to be constituted by the surface of the end of the optical fibre 20 and the facing upper surface of the beam 16; the second is constituted by the beam 16 itself; and the third by the lower surface of the beam and the facing surface of the diaphragm 10.

Again in FIG. 1, the curve 42 represents the variation of the modulation of the spectrum under the action of the interferometer constituted by the beam 16. It is well known that the optical thickness can be obtained from the formula:

$$E = \tfrac{1}{2} l^2 / (l2 - l1) \tag{1}$$

where l1 and l2 correspond to two successive minima of the intensity, l corresponds to a mean value between l1 and l2 and E corresponds to the optical thickness. The dependence on temperature of E being known, the temperature can thus be determined.

The curve 44 represents the variation of the modulation of the spectrum under the action of the interferometer constituted between the lower surface of the beam and the facing surface of the diaphragm 10 (FIG. 1).

The optical distance between the beam 16 and the diaphragm 10 is chosen to be sufficiently smaller than the optical thickness of the beam 16 that the modulation periods are different and do not become confused with each other. In the example shown in FIG. 3, the geometric distances are substantially the same, the difference between the optical distances being obtained thanks to the difference between the refractive index of the material forming the beam and of the air filling the space between the beam and the diaphragm. Knowledge of the individual contributions of the interferometers permits an automatic correction of the optical thickness measurement and the elimination of a disturbance due to the interferometer constituted between the beam and the diaphragm.

The contribution of the third interferometer constituted between the end of the fibre and the beam is not shown in FIG. 3. In effect, this does not interfere. The distance between the end of the fibre and the facing surface of the beam is chosen to be sufficiently large for the modulation of the spectrum to be very much less than that of the contribution due to the beam. The dimensions of the optical sensors do not permit the detection of such a modulation, which therefore does not affect the measurement.

According to a first embodiment, shown schematically in FIG. 1, the means for measuring the resonant frequency comprise means for illuminating the beam constituted by a light emitting diode 28 supplying a wide spectrum light beam to the input of the branch 22 of the fibre 20. At the output of the fibre 20, the light beam illuminates the beam and enters the interferometer constituted by the opposed surfaces of the beam 16 and the diaphragm 10.

The light beam reflected by this interferometer is therefore, as seen previously, directed from the output of the branch 23 of the fibre 20 to the spectrometer 32.

The array of sensors 36 detects the light beam spread out by the grating 34. But now only the variations with time of the light beam are of interest, and not its spectral spread. To this end, an optical sensor 38 of the array 36 delivers a signal proportional to the variations with time of the detected component. An optical sensor of the type of those included in an array made by the company UDT under the reference OSI-38-AUC is sensitive to frequencies up to 1 MHz, which is sufficient for measuring the resonant frequency of the beam which is in the region of 100 kHz.

FIG. 4 shows schematically the shape of the variations of intensity I of a spectral component with the distance d separating the beam from the diaphragm.

This distance d is modulated in accord with the periodic deformations of the beam due to the heating by the excitation light pulses. This modulation is produced at the resonant frequency f of the beam.

To obtain maximum sensitivity, the rest distance d should be chosen such that the phase change introduced by traversing twice the distance d is an odd multiple of /2, that is to say that the variations of d, following heating, should lie around one of the points d1, d2 or d3 in FIG. 4.

Again in FIG. 1, it can be seen that the sensor 38 is connected to an amplifier 42. The amplifier 42 produces an amplified signal and applies it in a proportional form at the resonant frequency f of the beam to the input of the modulator 26 and also to the input of calibration means 44.

Another input of the calibration means 44 is connected to an output of the microprocessor 40 supplying a signal proportional to the temperature. These calibration means 44 permit the pressure exerted on the diaphragm to be calculated from the temperature and resonant frequency of the beam. The calibration means can for example comprise look-up tables stored in memory and which read a pressure from a temperature-pressure pair according to the results of a previous calibration.

The measurement of the resonant frequency with the help of a single spectral component has the disadvantage of not having the same sensitivity at every temperature. In practice, the maximum sensitivity obtained around d1 (FIG. 4) only holds good for a certain range of temperature; when this latter varies further, the distance separating the beam from the diaphragm can change such that the variations of distance at the resonant frequency take place about a maximum or a minimum of the intensity curve, that is to say where the sensitivity is minimum. To this disturbance, a pressure effect is added. The curvatures of the beam and the diaphragm are different when a pressure is applied, resulting in an optical path difference disturbing the measurement.

The embodiment shown in FIG. 5 shows an apparatus for which the resonant frequency measurement is made from two spectral components, thanks to signals supplied by two optical sensors 38a and 38b of the array 36.

Advantageously, the sensors are disposed so as to detect spectral components having wavelength λa and λb, chosen such that an intensity extreme (minimum sensitivity) for one corresponds to the point of inflection of the intensity curve (maximum sensitivity: points d1, d2, d3, d'1, d'2, d'3) for the other (FIG. 6).

The sensors 38a and 38b are respectively connected to amplifiers 42a and 42b each supplying a signal corresponding to the resonant frequency to two inputs of selection means 43, which select the signal of strongest intensity. These selection means are connected at their output to the modulator 26 and to the calibration means 44.

It will be understood that the number of sensors in the array 36 used for the resonant frequency measurement is not limited to two. Thus all the sensors can be connected on the one hand to the microprocessor 40 for the measurement of temperature by spectral analysis, and on the other hand to amplifiers connected to selection means comprising for example a multiplexer and a comparator system for selecting the signal of strongest intensity.

I claim:

1. A temperature-compensated vibrating beam microsensor, comprising:
   a vibrating beam having a resonant frequency (f) dependent upon a physical parameter to be measured,
   means for exciting the vibrating beam,
   means for measuring the resonant frequency (f) of the vibrating beam,
   means for measuring the optical thickness of the beam,
   means for deducing the temperature from the optical thickness measurement, and
   means for determining the physical parameter to be measured from the resonant frequency and the temperature.

2. A microsensor according to claim 1, wherein the means for measuring the optical thickness of the beam comprise:
   means for illuminating the beam with a light beam having a wide wavelength spectrum, with a central wavelength chosen in the zone of quasi-transparence of the material forming the beam,
   a spectroscope for measuring the wavelength spectrum of the light beam reflected by the beam, and
   means for deducing the optical thickness from the modulation of the wavelength spectrum, the beam being an interferometer for the light beam.

3. A microsensor according to claim 2, wherein the spectroscope comprises a diffraction grating and an array of optical sensors.

4. A microsensor according to claim 2, wherein the means for illuminating comprise a light emitting diode coupled to an optical fiber directing the light beam from the diode onto the beam.

5. A microsensor according to claim 1 comprising:
   a diaphragm, the vibrating beam being joined by its ends to the diaphragm, the frequency of vibration of the beam being a function of a deformation of the diaphragm under the effect of a pressure, and the means for measuring the resonant frequency comprises means for illuminating the beam with a light beam, an interferometer constituted by the facing surfaces of the beam and the diaphragm, and
   at least one optical sensor adapted to detect a light beam reflected by the interferometer and to deliver a signal proportional to the resonant frequency of the beam.

6. A microsensor as claimed in claim 5, in which the means for illuminating also illuminate the beam with a light beam having a wide wavelength spectrum and a central wavelength in the zone of quasi-transparence of the beam, and the means for measuring the optical thickness of the beam include a spectroscope for measuring the wavelength spectrum of the light beam reflected by the beam and means for deducing the optical thickness from the modulation of the wavelength spectrum by the beam acting as an interferometer.

7. A microsensor according to claim 5, wherein the means for illuminating have a wide wavelength spectrum, and the microsensor comprises:

dispersion means adapted to disperse the different wavelength components of a light beam reflected by the interferometer, optical sensors adapted to detect the dispersed components, these sensors delivering a signal proportional to the resonant frequency of the beam, and selection means for selecting the highest intensity signal proportional to the resonant frequency.

8. A microsensor according to claim 7, in which the means for illuminating also illuminate the beam with a light beam having a wide wavelength spectrum and a central wavelength in the zone of quasi-transparence of the beam, and the means for measuring the optical thickness of the beam include a spectroscope for measuring the wavelength spectrum of the light beam reflected by the beam and means for deducing the optical thickness from the modulation of the wavelength spectrum by the beam acting as an interferometer and the dispersion means form part of the spectroscope.

9. A microsensor according to any of claims 1–8, wherein the means for exciting comprise a laser diode modulated at the resonant frequency of the beam and supplying light pulses, an optical fiber directing these light pulses onto the beam.

* * * * *

UNITED STATES PATENT AND TRADEMARK OFFICE
CERTIFICATE OF CORRECTION

PATENT NO. : 5,442,963
DATED : August 22, 1995
INVENTOR(S) : Largeau

It is certified that error appears in the above-indentified patent and that said Letters Patent is hereby corrected as shown below:

Column 7, line 16, "/2," should read --$\Pi/2$--.

Signed and Sealed this

Thirty-first Day of October 1995

*Attest:*

BRUCE LEHMAN

*Attesting Officer*   *Commissioner of Patents and Trademarks*